Jan. 30, 1940.　　　G. W. DUNHAM　　　2,188,810
WRINGER POST IRONER
Filed Feb. 4, 1936
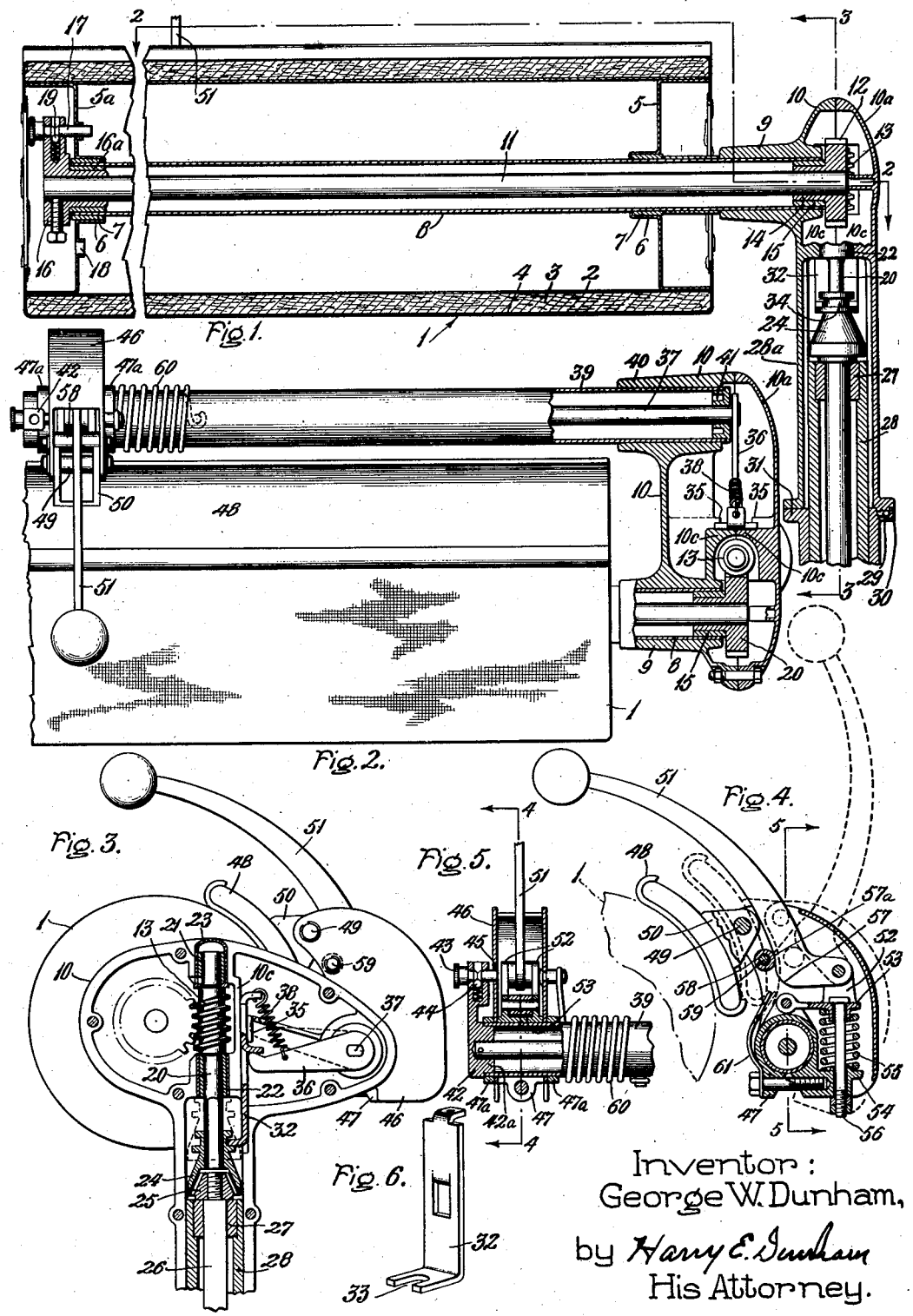
Inventor:
George W. Dunham,
by Harry E. Dunham
His Attorney.

Patented Jan. 30, 1940

2,188,810

UNITED STATES PATENT OFFICE 2,188,810

WRINGER POST IRONER

George W. Dunham, Westport, Conn., assignor to General Electric Company, a corporation of New York Application February 4, 1936, Serial No. 62,289

11 Claims. (Cl. 38—60)

The present invention relates to ironers of the rotary type in which the work is ironed between a padded roll and a heated shoe pressed against the roll.

The object of my invention is to provide an improved construction and arrangement in ironers of this type, and for a consideration of what I believe to be novel and my invention attention is directed to the following description and the claims appended thereto.

In the accompanying drawing, Fig. 1 is a sectional elevation of an ironer embodying my invention; Fig. 2 is a top plan view of the ironer in section along line 2—2 of Fig. 1; Fig. 3 is a sectional view taken on line 3—3 of Fig. 1; Fig. 4 is a sectional view taken on line 4—4 of Fig. 5; Fig. 5 is a sectional view taken on line 5—5 of Fig. 4; and Fig. 6 is a perspective view of the clutch operating link.

Referring to the drawing, the numeral 1 indicates the ironer roll which comprises a cylindrical steel shell 2 having suitable padding 3 on its surface held in place by a pad cover 4. Within each end of the shell are fixed cup-shaped disks 5 and 5a each having a cylindrical flange 6 at the center carrying bearings 7 which rotatably support the roll on a tube 8. The right-hand end of the tube is pressed into a boss 9 on part 10 of the housing for the driving mechanism for the ironer. A drive shaft 11 for the roll extends through the tube 8. The end of the shaft within the housing is fixed to a gear 12 which is driven by a worm gear 13. The gear 12 is provided with a projecting sleeve 14 which rotates in a bearing 15 carried by the tube 8. The other end of the shaft 11 projects through the open end of the tube 8 and is guided by a bearing 16a carried by an arm 16 fixed to the shaft. The arm 16 carries a clutch pin 17 which completes the driving connection from the shaft 11 to the roll by extending through one of the openings 18 in the disk 5a. The pin 17 is resiliently held in the position shown in Fig. 1 by a spring pressed ball 19. The roll may be uncoupled from the shaft 11 by pulling the pin 17 out of engagement with the opening 18.

The worm gear 13 is fixed to a shaft 20 which is carried in bearings 21 and 22 which are held between the part 10 and a complementary part 10a of the housing. The parts 10 and 10a of the housing have abutting walls 10c which provide a grease tight enclosure for the gears 12 and 13. The upper end of the shaft 20 is enclosed by a cup 23 which prevents the leakage of grease. The lower end of the shaft 20 extends below the bearing 22 and has a slidable clutch member 24 splined thereon. The clutch member 24 when in the full line position shown in Fig. 3 engages a beveled gear 25 fixed to the wringer drive shaft 26 of a domestic washing machine thereby completing a driving connnection from the wringer drive shaft to the roll drive shaft 11. The wringer drive shaft, which is rotated continuously by the washer driving mechanism, rotates in a bearing 27 fixed inside the wringer post 28. The parts 10 and 10a of the housing provide a depending cylindrical sleeve 28a which fits over the upper end of the wringer post and rests on a collar 31 fixed to the wringer post. The ironer is prevented from turning on the wringer post by a tongue 29 on part 28a of the housing which fits into one of a number of spaced holes 30 in the collar 31. The ironer can therefore occupy different angular positions with respect to the wringer post. The clutch member 24 is moved into and out of engagement with the gear 25 by means of a sliding link 32 having a fork 33 at its lower end which fits in a circular groove 34 in the clutch member 24. The link 32 is guided by ears 35 (see Fig. 2) formed on the parts 10 and 10a of the housing. The link 32 is lifted by means of lever 36 which is fixed to an operating rod 37 and is lowered by means of a spring 38 connected between the upper end of the link and the arm 36. The operating rod 37 extends through a tube 39 which is fixed in a boss 40 on the part 10 of the housing. The rod 37 is guided by means of a bearing 41 carried by the end of the tube 39 within the housing. The other end of the rod 37 projects through the open end of the tube 39 and has an arm 42 fixed thereto which has a cylindical boss 42a bearing in the end of tube 39. The arm 42 carries a clutch pin 43 which is resiliently held in the position shown in Fig. 5 by a spring pressed ball 44. This pin fits into a hole 45 in one of the side walls of a link or bracket 46 which is pivoted on the tube 39. The side walls of the link are located on the tube 39 by means of a member 47 which is clamped to the tube and by means of washers 47a. The link 46 supports a heated shoe 48 by means of a pin 49 which is carried between the side walls of the bracket and which extends through ears 50 of a lug secured to the shoe. As shown in Fig. 4, the shoe is moved into engagement with the roll by pivoting the bracket 46 about the tube 39.

The operating mechanism for moving the shoe into engagement with the roll comprises a lever 51 which is pivoted between ears 52 at one end of a link 53. The opposite end of the link 53 is pivoted to the member 47. Between the free end of the link 53 and a boss 54 on the member 47 is a prestressed coil spring 55 which limits the pressure which can be exerted by the lever 51. The prestressed spring is held in place by means of a bolt 56. The lever 51 is provided with a cam surface 57 which engages a sleeve 58 rotatably carried on a pin 59 between the side walls of the link 46. The operating mechanism for pressing the shoe against the roll is enclosed between the side walls of the link 46. As shown in Fig. 4, rotation of the lever 51 from the dotted line to the full line position causes the shoe to be moved against the roll. When in the full line position, the sleeve 58 rests in a slight depression 57a in the cam surface so that the lever will remain in the full line position. The spring 55 acting in series with the lever 51 provides a variable length connection between the shoe supporting bracket 46 and the tube 39. The line of action of this connection is such that pivotal movement of the bracket away from the roll compresses the spring. From another aspect, the spring resists movement of the shoe away from the roll. This action is due to the fact that the sleeve 58 pivots away from the roll about the tube 39. Due to the location of the spring 55 pivoting of the sleeve 58 away from the roll shortens the distance between the sleeve 58 and the spring seat on boss 54 and therefore compresses the spring. When the lever is moved in a clockwise direction toward the dotted line position a coil spring 60 arranged between the tube 39 and the link 46 causes the shoe to be returned to the dotted line position. At the end of this return movement, the lower edge of the shoe strikes a leaf spring 61 secured to the member 47 which prevents noise due to sudden stopping of the shoe.

As the shoe moves into engagement with the roll, the operating rod 37 moves in a counterclockwise direction as viewed in Fig. 3, thereby permitting the spring 38 to slide the clutch operating link 32 downward and move the clutch member 24 into engagement with the bevel gear 25 and complete the driving connection to the roll. This means that as soon as the shoe engages the roll, the roll starts turning. When the shoe is moved out of engagement with the roll, the operating rod 37 is moved in a clockwise direction, as viewed in Fig. 3, thereby disengaging the clutch 24 from the bevel gear 25.

One of the advantages of the operating mechanism for pressing the shoe against the roll is that the operating lever 51 is located at the center of the roll and projects over the top of the roll where it is accessible to either hand of the operator. Another advantage of this construction is that it eliminates the rock shaft which in previous constructions has extended from the housing through the tube which supports the shoe. This rock shaft has necessarily been of heavy construction in order to transmit the required pressing force to the shoe. In the present construction the operating rod 37 which extends through the tube 39 need only be strong enough to operate the clutch link 32.

In the use of the ironer, the ironer is first mounted on the upper end of the wringer post of a domestic washing machine. The material to be ironed is then placed on the padded roll in such position that it will project under the shoe when the shoe is pressed against the roll. The operating lever 51 is then pulled toward the operator, thereby pressing the shoe against the roll. At the instant of contact of the shoe with the roll, the clutch 24 engages the bevel gear 25 thereby completing the driving connection to the roll. The material is then drawn under the shoe by the roll. At the conclusion of the ironing, the operating lever 51 is pushed away from the operator, thereby moving the shoe out of engagement with the roll and at the same time moving the clutch member 24 out of engagement with the bevel gear 25 and stopping the rotation of the roll.

If the ironer is to be used for pressing, the clutch pin 17 is pulled outward, disengaging the pin from the opening 18 so that the roll may be freely turned on the supporting tube 8. When this is done, the driving connection to the roll is broken and the material placed between the roll and the shoe may be pressed.

What I claim as new and desire to secure by Letters Patent of the United States is:

1. An ironer comprising a padded roll, an arm extending along said roll, a link pivoted on said arm, a shoe carried on said link, and a pivoted lever carried by said arm having a cam surface engaging said link for moving said shoe against said roll, the axis about which said lever is pivoted being spaced from the axis about which said link is pivoted.

2. An ironer comprising a padded roll, an arm extending along said roll, a link pivoted on said arm, a shoe carried on said link, a pivoted lever carried by said arm having a cam surface engaging said link for moving said shoe against said roll, and means including a prestressed spring between said lever and said arm for limiting the pressure between the roll and the shoe.

3. An ironer comprising a padded roll, an arm extending along said roll, a shoe carried by said arm, a lever carried by said arm for moving said shoe against said roll, spring means for moving said shoe away from said roll, and a leaf spring carried by said arm and arranged to be engaged by said shoe for forming a resilient stop limiting the movement of the shoe away from the roll.

4. An ironer comprising a padded roll, an arm extending along said roll, a bracket pivoted on said arm, said bracket having spaced side walls and a wall connecting said side walls, a shoe carried by said bracket, a lever projecting from between the side walls of said bracket, and a mechanism operated by said lever and enclosed within the walls of said bracket for moving said shoe against said roll.

5. An ironer comprising a padded roll, an arm extending along said roll, a bracket pivoted on said arm, said bracket having spaced side walls and a wall connecting said side walls, a shoe carried by said bracket, a member secured to said arm between the side walls of said bracket, a link pivoted on said member, a lever pivoted on said link and projecting beyond said bracket, said lever having a cam surface engaging a pin between the side walls of the bracket for moving the shoe against the roll, and means including a prestressed spring between said link and said member for limiting the pressure between the roll and the shoe.

6. An ironer comprising a padded roll, an arm extending along said roll, a bracket pivoted on said arm, said bracket having spaced side walls and a wall connecting said side walls, a shoe carried by said bracket, and a pivoted lever carried by said arm between and projecting beyond the side walls of the bracket, said lever having a cam surface cooperating with the bracket for moving the shoe against the roll.

7. In an ironer having a roll, an arm extending along the roll, a link pivoted on the arm, a shoe carried by the link, and a variable length connection between said arm and said link comprising a spring and a lever acting in series, the line of action of said variable length connection acting at an angle to a radial line connecting the pivot of said link and the point of connection between said link and said variable length connection whereby movement of the shoe away from the roll is resisted.

8. In an ironer having a roll, an arm extending along the roll, a link pivoted on the arm, a shoe carried by the link, a variable length connection between said arm and said link comprising a spring and a lever acting in series, and means connecting one of the parts of said variable length connection to the arm at a point spaced from the pivotal axis of the link, the line of action of said variable length connection acting at an angle to a radial line connecting the pivot of said link and the point of connection between said link and said variable length connection whereby movement of the shoe away from the roll is resisted.

9. In an ironer having a roll, an arm extending along the roll, a link pivoted on the arm, a shoe carried by the link, a variable length connection between said arm and said link comprising a spring connected to said arm and a pivotally movable lever connected between the spring and the link, the line of action of said variable length connection acting at an angle to a radial line connecting the pivot of said link and the point of connection between said link and said variable length connection whereby movement of the shoe away from the roll is resisted, one of said connections to the lever being adjustable by pivotal movement of the lever whereby the length of the variable connection and therefore the position of the link with reference to the arm is adjusted.

10. In an ironer having a roll, an arm extending along the roll, a bracket pivoted on the arm, said bracket having spaced side walls and a wall connecting the side walls, a shoe carried by the bracket, a lever projecting from between the side walls of the bracket, and mechanism operated by said lever and enclosed within the walls of said bracket for moving the shoe against the roll, said mechanism including a spring and a lever arranged in series between said arm and said bracket, the line of action of said spring and lever acting at an angle to a radial line connecting the pivot of said bracket and the point of connection between said spring and lever and said bracket whereby movement of the shoe away from the roll is resisted.

11. An ironer comprising a padded roll, an arm extending along said roll, a bracket pivoted on said arm, said bracket having spaced side walls and a wall connecting said side walls, a shoe carried by said bracket, a pivotally movable lever carried between and projecting beyond the side walls of the bracket, a pre-stressed spring connected to said arm, and a part operable by said lever and arranged between said pre-stressed spring and said bracket for moving the shoe against the roll.

GEORGE W. DUNHAM.